Patented Feb. 28, 1928.

1,660,541

UNITED STATES PATENT OFFICE.

HERMANN BOLLMANN, OF HAMBURG, GERMANY.

EASILY-SOLUBLE COCOA POWDER AND PROCESS OF MAKING SAME.

No Drawing. Application filed December 15, 1925, Serial No. 75,624, and in Germany October 30, 1925.

For the purpose of increasing the solubility of cocoa-powder it has been the practice to effect the roasting of the cocoa-beans at a moderate temperature and to decrease as far as possible the fat-content of the powder. Nevertheless the solubility has heretofore always been imperfect. If cocoa, prepared with milk or water, is allowed to stand for a while, a portion of the particles suspended in the liquid are deposited in the form of a sediment.

The object of the present invention is to provide a method whereby it becomes possible to improve the solubility of the cocoa-powder and at the same time to increase the nourishing value thereof.

To this end after the cocoa-powder has been prepared, an addition is made thereto of phosphatides derived from vegetable materials, in particular from soy-beans. These phosphatides possess an intense emulsifying effect, and are thereby enabled to maintain in suspension the particles of cocoa floating in the liquid and to prevent the said particles from separating out to form a sediment. A further advantage of the addition consists in the fact that the cocoa-butter does not separate out from the liquid and float thereon in the form of fine drops of oil.

Experiments have shown that it is sufficient to add 2% of phosphatides to the cocoa-powder to achieve the desired effect. The said phosphatides, which may also have a small oil-content, take the form of viscous syrupy, or wax-like substances. At first they are mixed in a mill with a small quantity of cocoa-powder, the powder thus resulting being then very easily distributed throughout the main-mass of the cocoa-powder.

Whereas in the usual purification of the phosphatides by washing with acetone the phytosterol which is soluble therein is also removed, this is not the case if the purification of the phosphatides and the removal of unpleasantly tasting materials therefrom is effected without the employment of agents in which phytosterol is soluble. The purification can, for example, be effected by distilling the phosphatides, if necessary after adding water, under reduced pressure, after having removed by centrifugal means the main quantity of the oil contained therein and derived during their recovery from oil-seeds.

On account of the presence of the phosphatides and in particular of lecithin as also of phytosterol, a most advantageous vitamine effect is obtained for the so-treated cocoa-powder in addition to its increased solubility.

I claim:—

1. An improved process for the production of easily soluble cocoa-powder, characterized by the fact that the prepared cocoa-powder is provided with an addition of phosphatides containing phytosterine.

2. An improved easily soluble cocoa-powder comprising cocoa-powder intimately mixed with phytosterine-containing phosphatides.

3. An improved easily soluble cocoa-powder which comprises cocoa-powder mixed with about 2% of phosphatides of the kind found in oil seeds, the said phosphatides being free from the main quantity of the oil content of said oil seeds.

4. A product consisting essentially of of cocoa and phosphatides containing phytosterine, all in the form of a fine powder.

5. A product consisting essentially of cocoa and about 2% of phosphatides of the character of those found in soy beans, all in the form of a fine powder.

6. A product comprising cocoa-powder admixed with phosphatides containing phytosterine, but substantially free from the solid starchy matter of added edible seeds.

7. A product comprising cocoa-powder admixed with phosphatides containing phytosterine, but substantially free from the solid starchy matter of added edible seeds, such product being in the form of a powder.

In testimony whereof I affix my signature.

HERMANN BOLLMANN.